Patented June 16, 1942

2,286,714

UNITED STATES PATENT OFFICE 2,286,714

PHOTOGRAPHIC ELEMENT CONTAINING A TRISAZO DYE

Jonas John Chechak, Rochester, N. Y., assignor to Eastman Kodak Company, Rochester, N. Y., a corporation of New Jersey No Drawing. Application March 22, 1941, Serial No. 384,728

14 Claims. (Cl. 95—6)

This invention relates to a photographic element and more particularly to a single or multilayer photographic element wherein at least one of the layers is uniformly colored with a dye selected from the group of trisazo compounds having the general formula:

$$R-N=N-R_1-N=N-R_2-N=N-R_3$$

wherein R and $R_3$ each represents an aminonaphthol mono-sulfonic or di-sulfonic acid nucleus such as an "H" acid, "2S" acid or "S"-acid nucleus, and $R_1$ and $R_2$ each represents a benzene or a naphthalene nucleus. The nuclei represented by $R_1$ and $R_2$ can be further substituted in the free positions, if desired, by one or more monovalent substituents selected from the group including methyl, ethyl, propyl, butyl, methoxy, ethoxy, propoxy, methoxymethyl, methoxyethyl, chlorine, bromine, and the like atoms and groups of atoms.

It is well known in the photographic art that dyes used in photographic layers such as filter dyes, antihalation dyes and image-forming dyes should remain fixed in the layers wherein they are incorporated. Many of the dyes proposed, however, tend to migrate from one layer to another, while others are sufficiently non-diffusing, but have the disadvantage of being difficult to incorporate because of limited solubility characteristics, or, if capable of ready incorporation, cannot be satisfactorily bleached or removed from the layers during the processing operations. Then, too, there is always the problem of obtaining dyes, which in addition to having desirable characteristics of good solubility, non-diffusability, ease of bleaching, and the like, must also have satisfactory color ranges and have no adverse effects on sensitized emulsions.

While it is in general true that increase in molecular size of the dye molecule tends to decrease its solubility and hence its mobility in colloidal compositions, I have found, however, that a suitable dye for photographic layers must be chosen with some discrimination, in order to preserve the desirable values, and exclude those least desirable. Thus, I have found that the above described trisazo compounds of my invention are highly desirable coloring materials for photographic layers with none of the disadvantages mentioned. They do not seriously desensitize emulsions in which they are incorporated and can be decolorized readily by suitable treatment of the photographic material wherein they are contained.

Furthermore, the dyes which I have described and propose to use in photographic layers have good water-solubility, thus facilitating the preparation of dyed layers of adequate dye density without crystallization of the dye. Although my dyes may contain various monovalent substituents, it should be noted that the solubilizing groups on the end nuclei are limited in number to avoid too great a tendency to diffuse. For example, some non-diffusable dyes can be made to diffuse by introducing an excessive number of sulfonic acid groups into the dye molecule. This fact is well known in the dye art and I do not intend to include within the scope of my invention dyes containing an excess number of solubilizing groups which increase the diffusion tendency. In general, the dyes of the types described in my invention are satisfactory with not more than two sulfonic acid groups in each of the end nuclei, but may diffuse if they contain a greater number of sulfonic acid groups. It will be appreciated, therefore, that my dye compounds are critically balanced between type and color of the compound, its ease of bleaching, its solubility and its diffusion tendency.

It is an object of my invention, therefore, to provide a photographic element having at least one layer containing a trisazo dye therein which does not diffuse through gelatin or which diffuses only slightly. A further object is to provide dyes which do not seriously desensitize emulsion layers. A still further object is to provide dyes for color photography which can be bleached readily in the presence of a silver image by the use of a suitable bleaching agent. Another object is to provide image-forming dyes for color photography which have the proper spectral absorption ranges. Other objects will appear from the following description of my invention.

The trisazo compounds of my invention may be prepared by tetrazotizing diaminoazobenzenes, diamino azonaphthalenes or amino-phenyl-azo-naphthylamines and coupling with two molar equivalents of an aminonaphthol mono- or disulfonic acid. The amino-naphthol mono- or disulfonic acid may or may not be further substituted in the amino group by acyl, alkyl, aracyl, aralkyl, arylsulfonyl and the like groups.

The following examples, which are illustrative only, indicate dyes which are suitable for use according to my invention.

Example 1

The blue colored dye made by tetrazotizing 1 mole of 4-aminophenyl-1-(-azo-4')-(1'-naphthylamine-6'-sulphonic acid) and coupling in an alkaline solution with 2 moles of 1,8-benzoylaminonaphthol-3,6-disulfonic acid (benzoyl-H-acid) and having the following probable structure in the free state

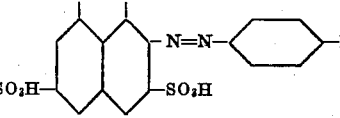

Example 2

The blue colored dye made by tetrazotizing 1 mole of 4,-4'-diaminoazobenzene and coupling with 2 moles of 1,8-aminonaphthol-2,4-disulfonic acid (2S acid) and having the following probable formula in the free state:

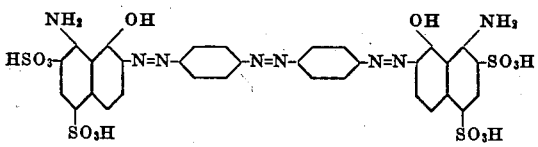

Example 3

The blue dye made by tetrazotizing 1 mole of 4,4'-diaminoazobenzene and coupling in an alkaline medium with 2 moles of S-acid (1,8-aminonaphthol-4-sulfonic acid) and having the following probable structure in the free state:

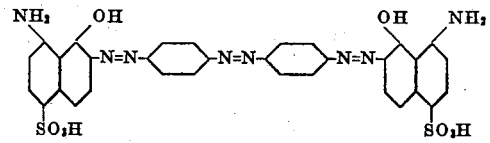

Example 4

The reddish blue dye made by tetrazotizing 1 mole of 4,4'-diaminoazobenzene and coupling in alkaline medium with 2 moles of 2-amino-8-naphthol-6-sulfonic acid and having in the free state the following probable structure:

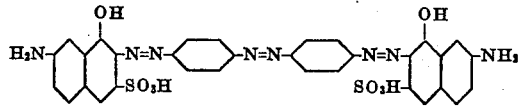

Example 5

The blue dye made by tetrazotizing 1 mole of 4,4'-diamino 2,5-dimethoxy-azobenzene and coupling in an alkaline medium with 2 moles of 2S-acid (1,8-aminonaphthol-2,4-disulfonic acid) and having in the free state the following probable formula:

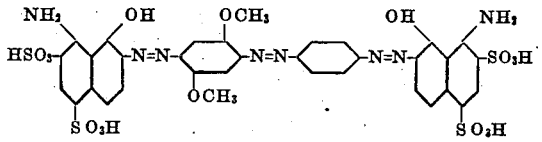

The dyes above described can be employed in filter overcoats, overcoats or interlayers in photographic films, plates or paper or they may be mixed with unsensitized or optically sensitized emulsions and employed in the preparation of films for color processes, in which the image is formed by destruction of a portion of a uniform dye concentration in the vicinity of a silver image by special treatment with solutions containing thiourea or hydrobromic acid and a catalyst, or, with a solution of sodium stannite as described in copending application Serial No. 360,622, filed October 10, 1940.

When used as image-forming dyes in light sensitive photographic layers, the dyes which I have described may be used in a photographic material such as that described in Christensen U. S. Patent No. 1,517,049, issued November 5, 1934. In the material described in the Christensen patent, the sensitive layers are uniformly colored a color complementary to that which they are designed to record. The blue-sensitive layer is colored yellow, the green-sensitive layer is colored magenta and the red-sensitive layer is colored blue-green. However, the dyes used according to my invention may also be incorporated in layers which are sensitized to any color. For example, the dyes proposed according to my invention, all of which are of bluish color may be incorporated in any or all desired layers of a multi-layer coating.

The sensitive compositions containing my dyes may be coated on transparent film supports such as a derivative of cellulose including cellulose nitrate, cellulose acetate, cellulose propionate, cellulose butyrate, cellulose acetate-propionate, cellulose acetate-butyrate, cellulose ether, and the like, as well as on synthetic resin supports such as polyvinyl acetal, and opaque supports such as paper or cellulose derivatives mixed with opaque white pigments. They may be used in single layer or multi-layer coatings or in multi-layer coatings on one or both sides of a support.

Dyes of the general structure which I have described are practically non-diffusing in gelatin and have little or no adverse effect on the sensitivity of the emulsion in which they are incorporated or on adjacent emulsion layers. They can be bleached in the presence of a silver or silver salt image with suitable bleaching solutions such as sodium stannite, the silver salt image being converted to a silver image in the operation, and when used in filter layers, they can be discharged by the use of sodium hydrosulfite or potassium permanganate and acid.

I claim:

1. A photographic element comprising a support having thereon a light-sensitive layer, at least one layer comprising gelatin and a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucleus, and $R_1$ and $R_2$ each represents a member selected from the group consisting of a benzene nucleus, and a naphthalene nucleus.

2. A photographic element comprising a support having thereon a light-sensitive layer, at least one layer comprising gelatin and a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucelus, and $R_1$ and $R_2$ each represents a benzene nucleus.

3. A photographic element comprising a support having thereon a light-sensitive layer, at least one layer comprising gelatin and a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucelus, $R_1$ represents a benzene nucleus, and $R_2$ represents a naphthalene nucleus.

4. A photographic element comprising a support having thereon a light-sensitive layer, at least one layer comprising gelatin and a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucleus, and $R_1$ and $R_2$ each represents a naphthalene nucleus.

5. A photographic element comprising a support having thereon a light-sensitive layer, at least one layer comprising gelatin and a dye having the general formula:

$$R-N=N-R_1-N=N-R_2-N=N-R_3$$

wherein R and $R_3$ each represents a member selected from the group consisting of a 1,8-aminonaphthol-monosulfonic acid nucleus, and a 1,8-aminonaphthol-disulfonic acid nucleus, and $R_1$ and $R_2$ each represents a benzene nucleus.

6. A photographic element comprising a support having thereon a light-sensitive layer, at least one layer comprising gelatin and a dye having the general formula:

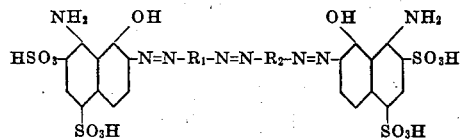

wherein $R_1$ and $R_2$ each represents a benzene nucleus.

7. A photographic element comprising a support having thereon a light-sensitive layer, at least one layer comprising gelatin and a dye having the formula:

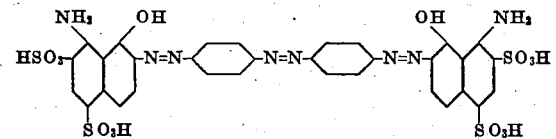

8. A gelatino-silver halide layer for a dye-bleaching process of color photography, uniformly colored with a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucleus, and $R_1$ and $R_2$ each represents a member selected from the group consisting of a benzene nucleus, and a naphthalene nucleus.

9. A gelatino-silver halide layer for a dye-bleaching process of color photography, uniformly colored with a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucleus, and $R_1$ and $R_2$ each represents a benzene nucleus.

10. A gelatino-silver halide layer for a dye-bleaching process of color photography, uniformly colored with a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucleus, $R_1$ represents a benzene nucleus, and $R_2$ represents a naphthalene nucleus.

11. A gelatino-silver halide layer for a dye-bleaching process of color photography, uniformly colored with a dye having the general formula:

$$R-N=N-R_1-N=N-R_2-N=N-R_3$$

wherein R and $R_3$ each represents a member selected from the group consisting of an aminonaphthol-monosulfonic acid nucleus, and an aminonaphthol-disulfonic acid nucleus, and $R_1$ and $R_2$ each represents a naphthalene nucleus.

12. A gelatino-silver halide layer for a dye-bleaching process of color photography, uniformly colored with a dye having the general formula:

$$R-N=N-R_1-N=N-R_2-N=N-R_3$$

wherein R and $R_3$ each represents a member selected from the group consisting of a 1,8-aminonaphthol-monosulfonic acid nucleus, and a 1,8-aminonaphthol-disulfonic acid nucleus, and $R_1$ and $R_2$ each represents a benzene nucleus.

13. A gelatino-silver halide layer for a dye-bleaching process of color photography, uniformly colored with a dye having the general formula:

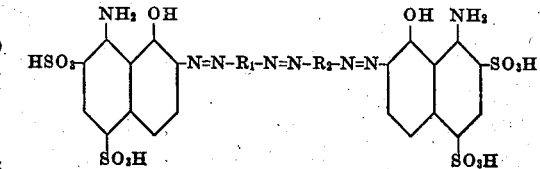

wherein $R_1$ and $R_2$ each represents a benzene nucleus.

14. A gelatino-silver halide layer for a dye-bleaching process of color photography, uniformly colored with a dye having the formula:

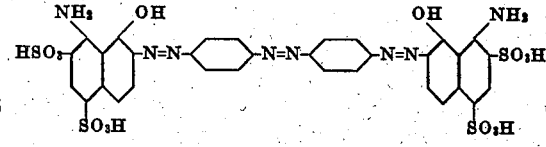

JONAS JOHN CHECHAK.